(12) United States Patent
Honnell

(10) Patent No.: US 7,014,175 B2
(45) Date of Patent: Mar. 21, 2006

(54) PACKING FOR COLUMN

(76) Inventor: Marvin A. Honnell, 12116 Kensington Ave., Hayden, ID (US) 83835

( * ) Notice: Subject to any disclaimer, the term of this patent is extended or adjusted under 35 U.S.C. 154(b) by 0 days.

(21) Appl. No.: 10/703,976

(22) Filed: Nov. 7, 2003

(65) Prior Publication Data
US 2005/0098908 A1    May 12, 2005

(51) Int. Cl.
B01F 3/04    (2006.01)
(52) U.S. Cl. .................. 261/94; 261/DIG. 72
(58) Field of Classification Search .......... 261/94, 261/95, 108, 111, 113, DIG. 72
See application file for complete search history.

(56) References Cited

U.S. PATENT DOCUMENTS

| 3,543,937 | A | * | 12/1970 | Choun | 210/150 |
| 3,752,453 | A | * | 8/1973 | Doyne | 261/94 |
| 3,758,087 | A | * | 9/1973 | Hoon, Jr. | 261/94 |
| 3,823,924 | A | * | 7/1974 | Hoon, Jr. | 261/94 |
| 3,924,807 | A | * | 12/1975 | Morgan | 239/55 |
| 4,072,736 | A | * | 2/1978 | Fattinger | 261/97 |
| 4,113,810 | A | * | 9/1978 | Ikawa | 261/98 |
| 4,197,264 | A | * | 4/1980 | Degg | 261/98 |
| 4,200,532 | A | * | 4/1980 | Iwatani et al. | 210/151 |
| 4,203,935 | A | * | 5/1980 | Hackenjos | 261/98 |
| 4,425,285 | A | * | 1/1984 | Shimoi et al. | 261/95 |
| 4,487,727 | A | * | 12/1984 | Ballato, Jr. | 261/94 |
| 4,522,767 | A | * | 6/1985 | Billet et al. | 261/94 |
| 4,554,114 | A | * | 11/1985 | Glen et al. | 261/95 |
| 4,581,299 | A | * | 4/1986 | Jager | 428/542.8 |
| 4,668,442 | A | | 5/1987 | Lang | |
| 4,724,593 | A | * | 2/1988 | Lang | 29/896.6 |
| 4,731,205 | A | * | 3/1988 | McNulty | 261/94 |
| 4,842,920 | A | * | 6/1989 | Banai et al. | 428/184 |
| 4,863,606 | A | * | 9/1989 | Ryall | 210/605 |
| 5,188,772 | A | * | 2/1993 | Yu | 261/94 |
| 5,401,398 | A | * | 3/1995 | McManus | 210/150 |
| 5,670,095 | A | * | 9/1997 | Southam | 261/97 |
| 5,690,819 | A | * | 11/1997 | Chianh | 210/150 |
| 6,371,452 | B1 | * | 4/2002 | Shojaie | 261/94 |
| 6,379,032 | B1 | * | 4/2002 | Sorensen | 366/130 |
| 6,387,534 | B1 | * | 5/2002 | Niknafs | 428/596 |
| 6,524,849 | B1 | * | 2/2003 | Swift et al. | 435/299.1 |
| 6,631,890 | B1 | * | 10/2003 | Lau | 261/94 |
| 6,811,147 | B1 | * | 11/2004 | Lau et al. | 261/95 |
| 2003/0146524 | A1 | * | 8/2003 | Niknafs | 261/94 |

FOREIGN PATENT DOCUMENTS

| DE | 3244921 A1 | * | 6/1984 |
| GB | 2061756 A | * | 5/1981 |
| JP | 55-114327 | * | 9/1980 |
| JP | 2-119931 | * | 5/1990 |
| WO | WO 89/05688 | * | 6/1989 |
| WO | WO 93/05876 | * | 4/1993 |

* cited by examiner

Primary Examiner—Scott Bushey
(74) Attorney, Agent, or Firm—Dhingra & Associates; Harish Dhingra

(57) ABSTRACT

Packing elements typically used in columns to enhance chemical reactions are illustrated. The packing element may be shaped as a sphere, ellipsoid or any shape of a revolution of a conic. Alternate embodiments illustrated may have faces analogous to crystal shapes. The packing elements have various shapes of drip points. The construction of the element is such that pieces can be folded thus saving assembly time and cleaning time.

66 Claims, 5 Drawing Sheets

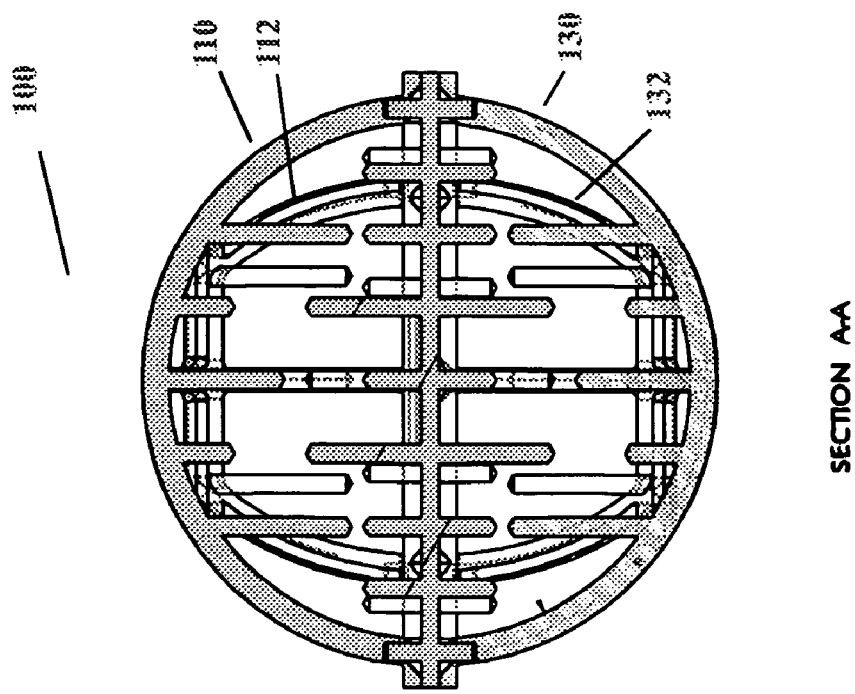
FIGURE 1A
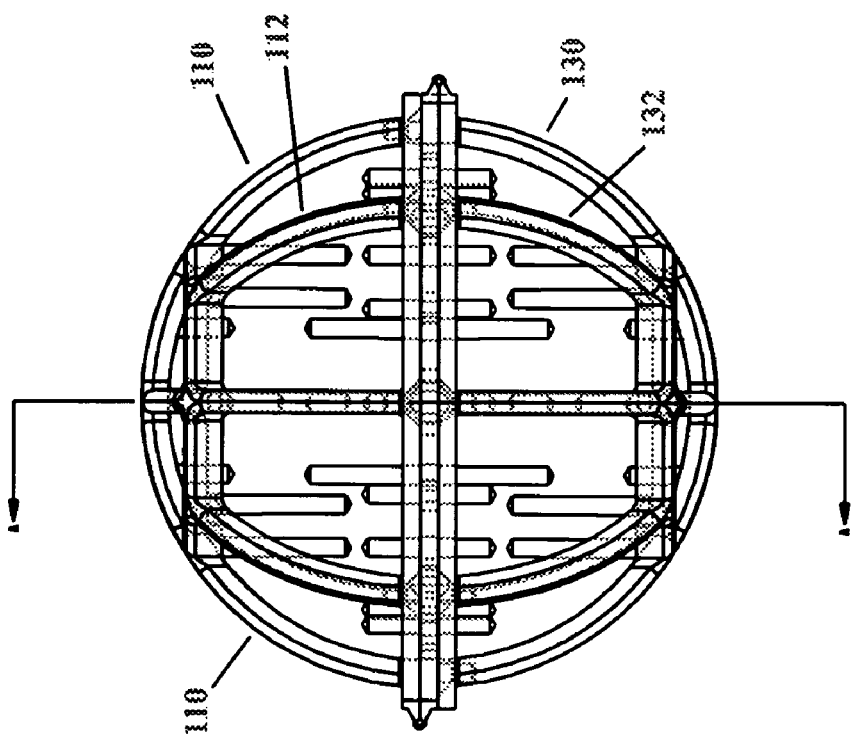
FIGURE 1B
SECTION AA
FIGURE 1

PACKING FOR COLUMN

CROSS-REFERENCE TO RELATED APPLICATIONS

Ser. No. 10/231,500 in which the applicant is a co-inventor.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to chemical processes and more particularly to packings in columns.

2. Description of the Related Art

Column packing is used in the chemical, environmental, and petrochemical industries. The packing elements are generally used to enhance chemical reaction throughput. Such column packing are generally divided into three classes, namely:
  a) Random or dumped packing: These are discrete pieces of packing of a specific geometrical shape, which are dumped or randomly packed into the column shell.
  b) Structured or systematically arranged packing: These are crimped layers of wire mesh or corrugated sheets. Sections of these packing are stacked in the column.
  c) Grids: These are also systematically arranged packing, but instead of wire-mesh or corrugated sheets, these grid-packings use an open-lattice structure.

There are three generations of evolution in packing. An overview of the three generations of developments packing is provided in the related application Ser. No. 10/231,500.

One of the continuing challenge for improving the known art of packing design involves increasing the total available surface areas of the packing elements while maintaining the structural strength and improving fluid flow.

By increasing the surface area of packing, more liquid loading (in terms of gallons per minute per square feet) can be achieved, which in return can improve the reaction efficiency at the wetting surface of, for example, gas stream and liquid feed stream, as in the example of toxic gas scrubber process, or for liquid feed streams in a distillation column operation. However, increasing the surface area typically leads to increased resistance to the fluid flow which in turn decreases the throughput. On the other hand, cutting materials from the packing may increase the fluid flow but may reduce the structural strength of the packing, which may cause collapse of the elements and necessitate their replacement. Thus, design of the packing elements presents interesting mathematical challenges of competing problems of providing maximum contact area to improve reaction rates, maintain structural strength, and improve fluid flow.

In order to increase the surface area, the packing elements become more complex in geometrical shapes, resulting in more individual breakage, less structural rigidity, and more interlocking inside a CPI column. Thus, the challenge facing packing element technology is how to significantly increase the surface area without sacrificing the structural integrity of the individual packing.

The engineers persistently encounter the problem of carving out more space (for increased throughput) to produce more surface area (for increased reaction surface) from materials like metals or plastics because the operation will always weaken structural integrity. The more complex geometrical shapes, the more surface area, and the damage to the structural integrity of the packing.

Therefore, it would be highly desirable to design geometrical shapes, which not only maximize reactants surface contact area, maintain structural integrity of the structure but also minimize pressure drop to enhance the throughput of the apparatus. It is also desirable to design geometries that would prevent nesting by eliminating sharp protrusions that may be damaged in loading the apparatus. Yet another desirable characteristic would be to design the geometry that would provide easy removal of the packing from tower columns for periodic cleaning. Still another desirable characteristic would be easy element assembly to sufficiently reduce assembly time and reduce corresponding cost

BRIEF SUMMARY OF THE INVENTION

In one aspect, this invention relates to random or dumped packing element. One embodiment of the element has two segments of an apertured revolution of a conic and a middle section. The two halves and the middle section can be folded to assemble the packing element. The three parts of the element may be connected by living hinges to facilitate easy assembly for use as well as easy removal and opening for cleaning and other necessary operations. In another embodiment the two halves and the middle section have drip points on the middle section. The drip points may be advantageously placed on any suitable locations in the element. In another embodiment the packing element may like crystalline faces with drip points so as to be suitable for various applications. A method of making the elements by molding process involves pouring suitable material in the mold and extracting an element having three or more connected parts.

BRIEF DESCRIPTION OF THE SEVERAL VIEWS OF THE DRAWINGS

A better understanding of the present invention can be obtained when the following detailed description of some embodiments is considered in conjunction with the following drawings in which:

FIG. 1: is the end view of an example embodiment of a packing element folded into a sphere shape from the three continuous sections wherein all sides look the same and are equal because all sides are geometrically progressive.

DETAILED DESCRIPTION OF THE INVENTION

Figure 2:
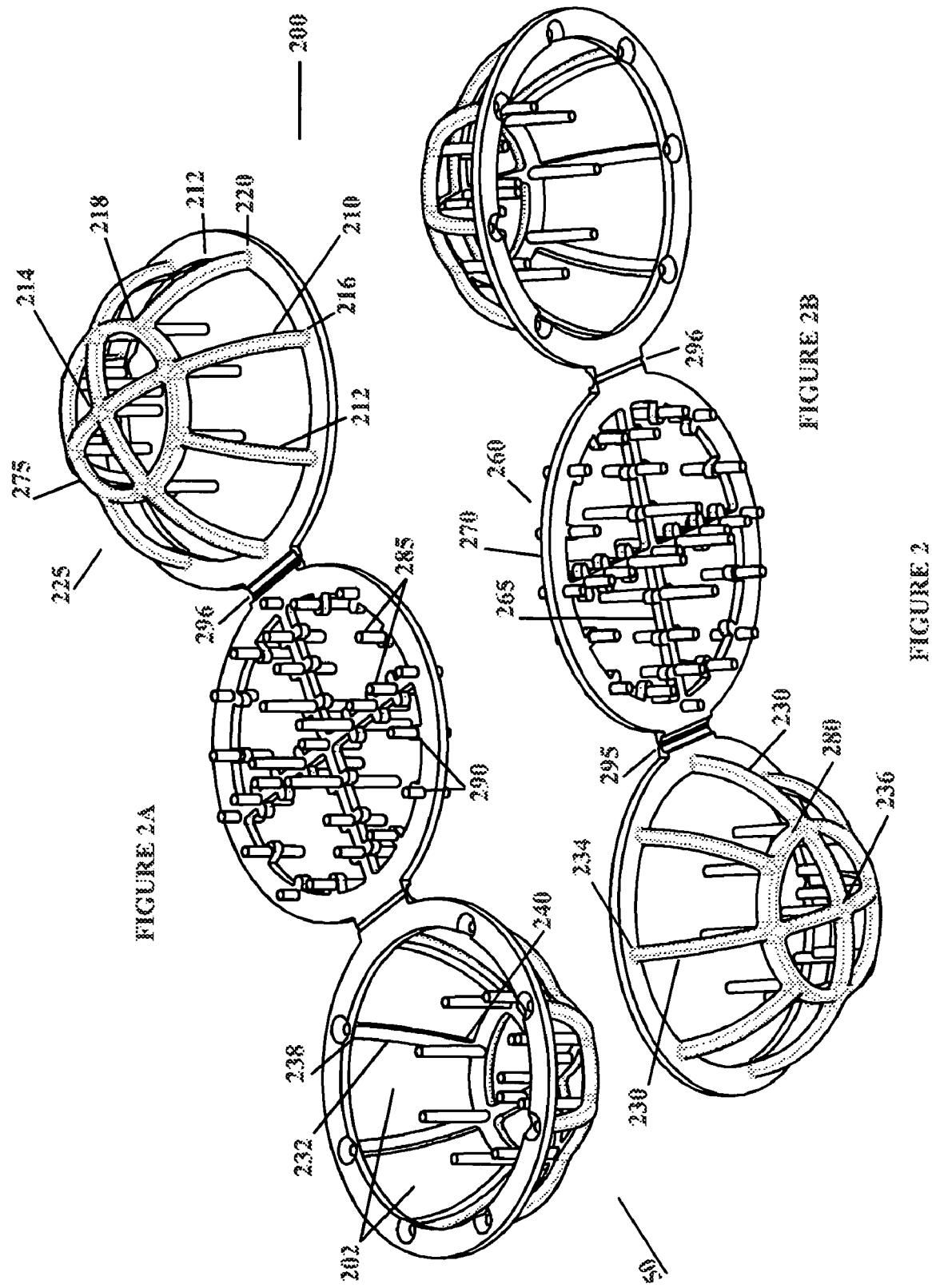
FIG. 2: is the Isometric view of an example embodiment of a continuous piece of three sections that are tied together without interruption creating two half spheres and one center section which when assembled become packing element of FIG. 1.

With reference to FIGS. 1 and 2 show an end view and a sectional view of an example embodiment of a packing element 100 is illustrated. The packing element has a plurality of ribs 110, 112, 210, 212, 218, 230, 232, and 280. In general, the ribs can be connected to form two segments of a shell of a revolution of a conic section. Although segments 225 and 250 are shown as segments of a sphere, it is possible to make two segments by cutting the shell at an angle from the major plane or the minor plane of the shell. The cutting may be along a plane of a conic section or other cuttings like zigzag cutting may be employed. Such variations would be apparent to those skilled in the art. A conic section structure 260 is connected to the two segments so that the two segments and the conic section structure can be folded to make a packing element 100. The conic section shown is circular but other shapes will result if the two segments are formed by cutting the shell of revolution at different angles as mentioned above. The conic section structure may be reinforced by reinforcing ribs. The reinforcing ribs may be positioned like spokes, like a mesh, nearly parallel to each other, or crisscrossing each other at one or more angles.

Still referencing FIGS. 1 and 2, the packing element has a first plurality of external ribs 110, 112, 210, 212. Each of the external ribs has a first end 218 (e.g. for external rib 210), and a second end 220 (e.g. for external rib 210). The first plurality of external ribs is longitudinally spatially positioned and connected together at their first ends (i.e. north pole) and is further connected together at their second ends (i.e. for example equatorially spaced) to form a first half 225 of a ribbed shell 100 of a revolution of a conic section. The ribbed shell may be a sphere, ellipsoid, section of a paraboloid, or section of a hyperboloid branch. The second ends may be connected by a thin wire or may be by a simple ring integrally connecting the second ends. Similarly, a second plurality of external ribs 130, 132, 230, 232, each rib has a third end 236 (e.g. for external rib 230) and a fourth end 238 (e.g. for external rib 230). The second plurality of the external ribs are likewise longitudinally spatially positioned and connected together at their third ends (i.e. south pole) and connected together at their fourth ends to form a second half 250 of a ribbed shell of the revolution of a conic section in an analogous fashion to the first half. A spoked conic section structure 260 comprising a plurality of radial ribs 265 which are connected to a ring 270 so that the spoked conic section structure fits between the first half and the second half of the ribbed shell to form the packing element. The shape of the spoked conic section depends on the selected shape of the first half and the second half of the ribbed shell. Thus, the packing element defines a plurality of apertures through which the reacting fluids can freely flow and mix to promote chemical reactions.

In an alternative embodiment, the packing element further includes at least one first latitudinal rib 275 in the first half. In this embodiment the first end of at least one of the first plurality of external ribs terminates to connect at the at least one first latitudinal rib. This configuration further provides additional strength to the structure and also creates additional aperture space that facilitates throughput. In a similar fashion, the packing element may further have at least one second latitudinal rib 280 in the second half. Also, in this configuration the third end of the at least one of the first plurality of external ribs terminates to connect at the at least one second latitudinal rib. Those skilled in the art would be able to add additional latitudinal ribs and generate numerous combinations of connecting the external ribs to the latitudinal ribs.

In any embodiment of the packing element the external ribs and the radial ribs need to have sufficient cross section to be able to withstand external loads due to fluids based on particular application. Further, the external ribs may comprise rods having various different cross sections to facilitate fluid flow as well as provide fluid surface area for enhancing reactions. For example, the cross section may be circular, oval, rectangular, triangular and other variations thereof as would be evident to those skilled in the art. Further, the ribs may be straight or be twisted and/or may have grooves to provide additional surface area to enhance reactions.

In a still another embodiment the radial ribs further include drip points 285. These drip points may be attached separately or may be fabricated integrally with the radial ribs. As illustrated, the drip points in FIGS. 1 and 2 are shown emanating inwardly in the packing element which are perpendicular to latitudinal planes. However, those skilled in the art may vary the directions of drip points as emanating towards the focal points or other combinations thereof. The drip points may have cross section that is circular, elliptical, triangular, rectangular or other combinations which those skilled in the art may easily conceive of. Further, the ring may further comprise drip points 290. Although, FIGS. 1 and 2 illustrate a spherical packing element, one may construct packing elements which are shaped as other revolutions of conic sections. In other embodiments the radial ribs of the packing element may have drip points. Likewise, the drip points may be placed at any of the interior surfaces.

In the packing element, the first half and the second half are coupled to the spoked conic section structure to enable folding to make the packing element. In the embodiment illustrated in FIGS. 2A and 2B, the first spherical half and the second spherical half are connected with the spoked wheel like structure. In one embodiment the first half and the second half are coupled to the spoked conic section structure by living hinges 295 and 296 to enable folding to make the packing element. The living hinges allow easy assembly of the element by eliminating the need for alignment of the pieces. This feature saves considerable operator time in assembling and opening the element for cleaning the elements.

Figure 3:
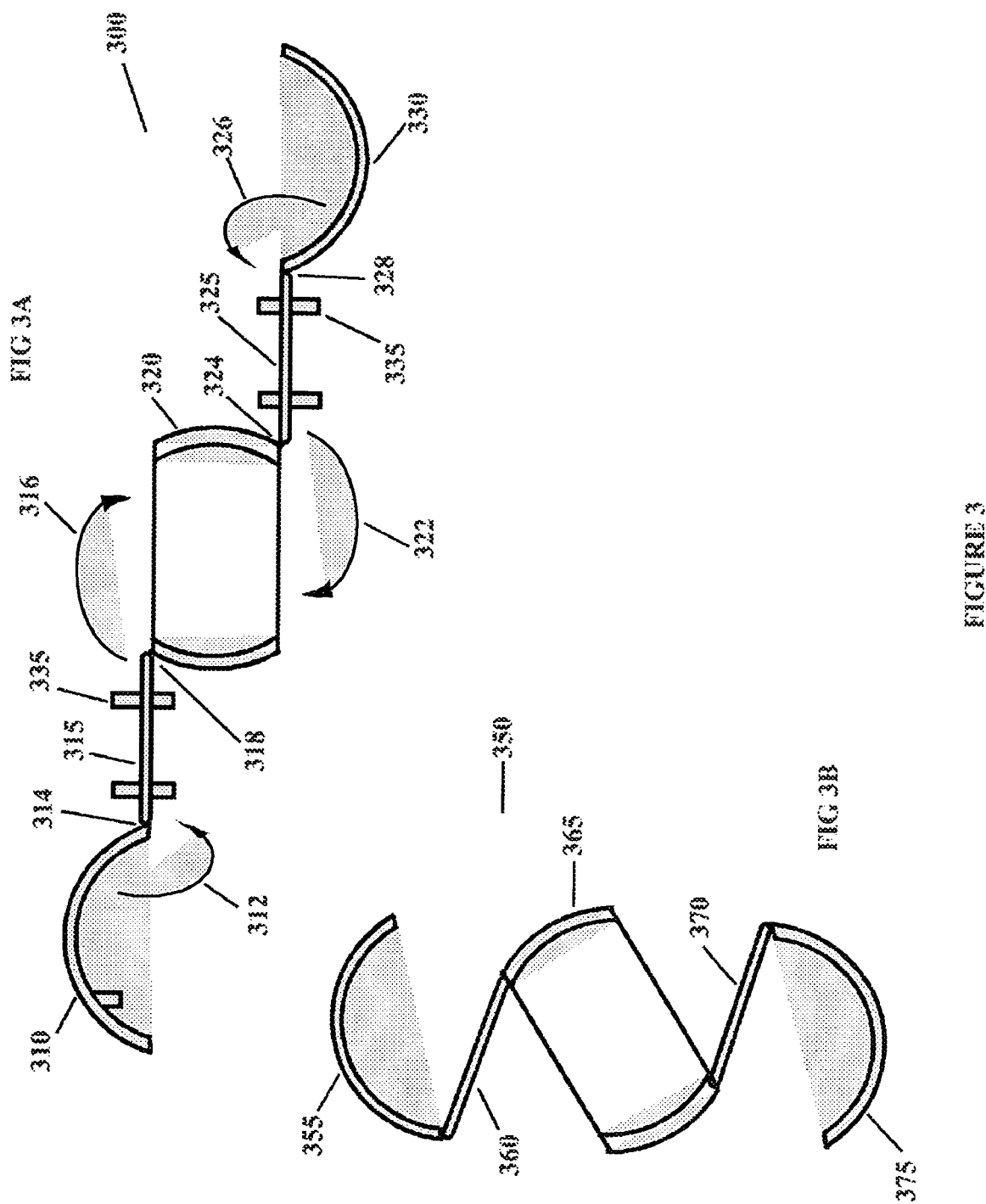
FIG. 3: shows examples of how multi-pieces could be designed to obtain packing element of FIG. 2.

With reference to FIG. 3A, in a yet another embodiment, the entire element 300 may be constructed as a five-piece element which when folded becomes the whole element. The embodiment illustrated in FIG. 3A has a segments shown as 310, 315, 320, 325, and 330. The example respective directions for folding the five elements are indicated by arrows marked 312, 316, 322, and 326. Obviously, there are many variations for folding the segments of the element. The segments may further be connected, for example, by living hinges 314, 318, 324, and 328. There may be drip points 335 positioned on any of the segments.

With reference to FIG. 3B, in a still another example embodiment, the entire element 350 may be constructed as a five-piece element which when folded becomes the whole element. The embodiment illustrated in FIG. 3B has a segments shown as 355, 360, 365, 370 and 375. Again folding the segments is obvious where any suitable connection may be used to join the segments and drip points may be suitably provided.

It is worth noting that the above embodiments of the element have up to about ninety eight percent void space in which considerable surface is provided for reactants to come in contact with each other. Also, fluid flow is facilitated by various features of the design of the embodiments.

Figure 4:
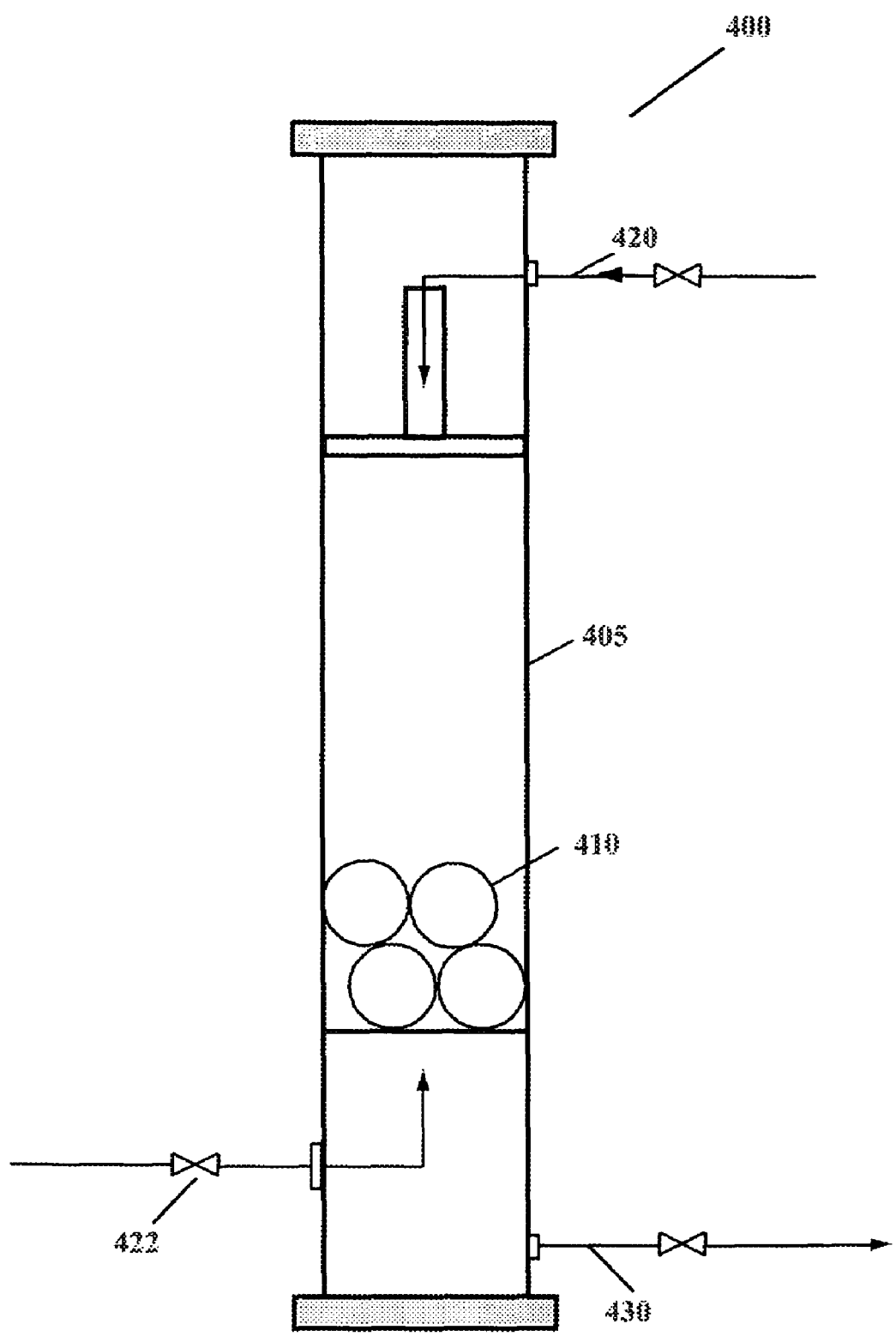
FIG. 4: is an example system of a column in which packing element of FIG. 2 is used.

With reference to FIG. 4 a system 400 for utilizing the packing element is illustrated. The system has a column 405 in which at least one packing element 410 is packed.

However, generally a plurality of packing elements is packed depending on specific application. The packing element of FIGS. 1 and 2 have been described in the previous paragraphs. Typically, a column has at least one inlet port 420 for one reacting fluid, a second inlet port 422 for a second reacting fluid, and at least one outlet port 430 for discharging the output. The column may have different combinations of inlet ports and output ports based on specific application.

Typically, the system 400 is used for enhancing chemical reaction between two or more fluids, for example one of the fluids may be gaseous and the other fluid may be in a liquid form. The gaseous fluid is generally injected from lower input port 422 and the liquid is typically injected into the input port 420 so that the reacting fluids have enhanced surface area substantially provided by the packing elements over which the fluids interact where the packing element provides least obstruction to the fluid flow. Generally, the output of the reactions is discharged from the port 430 which is positioned according to the state of the final product e.g. a liquid or a gas. The packing elements may be arranged in a structured packed manner or in a random packed fashion.

Figure 5:
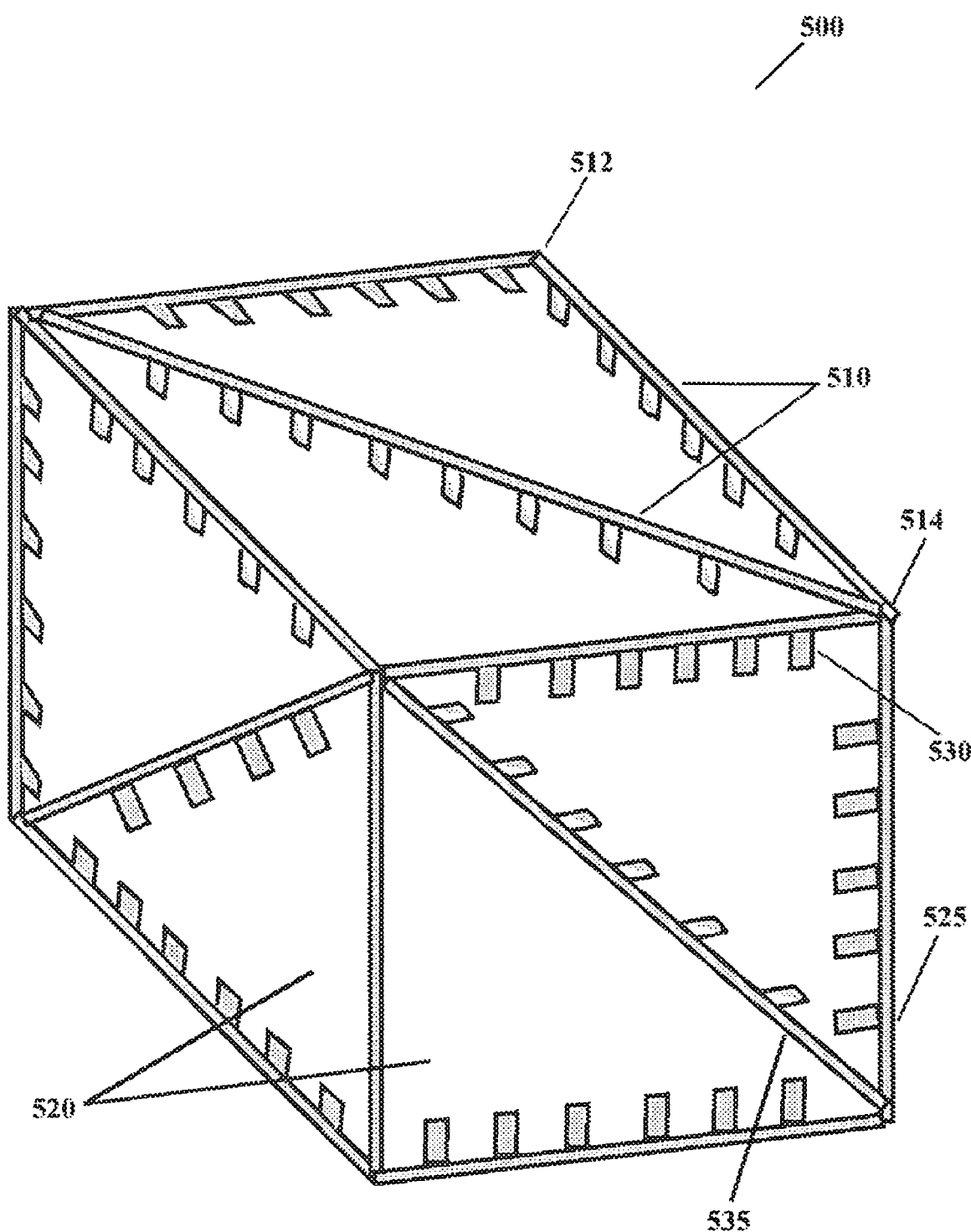
FIG. 5: is an isometric view of an alternative shape of packing element based on design of the invention.

With reference to FIG. 5, an alternate embodiment of a packing element 500 is illustrated. A plurality of external ribs 510 in which each rib has a first end 512 and a second end 514 (e.g. for rib 510). The first plurality of external ribs form a plurality of lattice faces 520. The plurality of lattice faces is coupled to form a crystal-faced structure 525 with apertures to form a packing element. Further, at least one rib has at least one drip points 530. The lattice faces may be further structurally strengthened by connecting the appropriate nodes of the lattice face by additional ribs 535. Thus, the lattice face may be any valid crystal face; a packing element may be constructed.

The method of making a packing element includes making a mold, wherein the mold comprises spaces to yield a packing element when filled with molten material. The technology of molding is well known to those skilled in the art. The details of the packing element have been already described with reference to FIGS. 1, 2, and 5. The material for molding operations may be any of the well known resins which would be apparent to those skilled in the art and have been further indicated in the related application.

The foregoing disclosure and description of the preferred embodiment are illustrative and explanatory thereof, and various changes in the components, construction and technique of operation may be made without departing from the spirit and scope of the claims appended herein.

What is claimed is:

1. A packing element comprising:
   a plurality of ribs connected to form a first segment and a second segment of a ribbed shell of a revolution of a conic section;
   a conic section structure connected to a reinforcing plurality of ribs, wherein the conic section structure is connected to the first segment and to the second segment to enable folding to make the packing element; and
   at least one drip point positioned within the packing element.

2. A packing element as in claim 1, wherein the packing element defines apertures.

3. A packing element as in claim 1, wherein the plurality of ribs comprises a first plurality of longitudinal ribs and at least one first latitudinal rib in the first segment, and wherein each first plurality of longitudinal ribs further comprises correspondingly a first end and a second end.

4. A packing element as in claim 3, wherein the first end of at least one of the plurality of ribs terminates to connect at the at least one first latitudinal rib.

5. A packing element as in claim 1, wherein the plurality of ribs comprises a second plurality of longitudinal ribs and at least one second latitudinal rib in the second segment, and wherein each second plurality of longitudinal ribs further comprises correspondingly a third end and a fourth end.

6. A packing element as in claim 5, wherein the third end of at least one of the plurality of ribs terminates to connect at the at least one second latitudinal rib.

7. A packing element as in claim 1, wherein the plurality of ribs and the reinforcing plurality of ribs have cross section sufficient to withstand external load due to fluids in a particular application.

8. A packing element as in claim 1, wherein the plurality of ribs comprise rods having a circular cross section.

9. A packing element as in claim 1, wherein the plurality of ribs comprise rods having non-circular cross-section.

10. A packing element as in claim 9, wherein the plurality of ribs comprise rods twisted along the length to increase the contact area.

11. A packing element as in claim 1, wherein the plurality of ribs further comprise grooves.

12. A packing element as in claim 1, wherein the reinforcing plurality of ribs further comprise drip points.

13. A packing element as in claim 12, wherein the drip points are integral to the reinforcing plurality of ribs.

14. A packing element as in claim 1, wherein the ribbed shell of the revolution of a conic section is spherical.

15. A packing element as in claim 1, wherein the ribbed shell of the revolution of a conic section is ellipsoidal.

16. A packing element as in claim 1, wherein the drip points emanate inwardly in the packing element.

17. A packing element as in claim 1, wherein the conic section structure is reinforced with diametrically positioned reinforcing plurality of ribs to appear like a spoked wheel structure.

18. A packing element as in claim 1, wherein the conic section structure is reinforced with the reinforcing plurality of ribs positioned nearly parallel to each other.

19. A packing element as in claim 1, wherein the conic section structure is reinforced with the reinforcing plurality of ribs angularly positioned to each other.

20. A packing element as in claim 19, wherein the conic section structure is reinforced with the reinforcing plurality of ribs forming a mesh.

21. A packing element as in claim 1, wherein the conic section structure further comprises drip points.

22. A packing element as in claim 1, wherein the reinforcing plurality of ribs further comprise drip points.

23. A packing element as in claim 1, wherein the first segment and the second segment are coupled to the conic section structure to enable folding to make the packing element.

24. A packing element as in claim 23, wherein the first segment and the second segment, are coupled to the conic section structure by living hinges to enable folding to make the packing element.

25. A packing element as in claim 23, wherein the first segment, the second segment, and the conic section structure are snapped together to make the packing element.

26. A packing element as in claim 24, wherein the first segment comprises a plurality of segments of the first segment.

27. A packing element as in claim 24, wherein the second segment comprises a plurality of segments of the second segment.

28. A packing element as in claim 24, wherein the conic section structure comprises a plurality of segments of the conic section structure.

29. A packing element comprising:
a first plurality of external ribs, each rib having a first end, and a second end, said first plurality of external ribs longitudinally spatially positioned and connected together at their first ends and connected together at their second ends to form a first half of a ribbed shell of a revolution of a conic section;
a second plurality of external ribs, each rib having a third end and a fourth end, said second plurality of external ribs longitudinally spatially positioned and connected together at their third ends and connected together at their fourth ends to form a second half of a ribbed shell of the revolution of a conic section;
a spoked conic section structure comprising a plurality of radial ribs connected to a ring so that the spoked conic section structure fits between the first half and the second half of the ribbed shell to form the packing element; and
at least one drip point positioned within the packing element.

30. A packing element as in claim 29, wherein the packing element defines apertures.

31. A packing element as in claim 29, wherein the packing element further comprises at least one first latitudinal rib in the first half.

32. A packing element as in claim 31, wherein the first end of at least one of the first plurality of external ribs terminates to connect at the at least one first latitudinal rib.

33. A packing element as in claim 29, wherein the packing element further comprises at least one second latitudinal rib in the second half.

34. A packing element as in claim 33, wherein the third end of at least one of the second plurality of external ribs terminates to connect at the at least one second latitudinal rib.

35. A packing element as in claim 29, wherein the external ribs and the radial ribs have cross section sufficient to withstand external load due to fluids in a particular application.

36. A packing element as in claim 29, wherein the external ribs comprise rods having a circular cross section.

37. A packing element as in claim 29, wherein the external ribs comprise rods having non-circular cross-section.

38. A packing element as in claim 37, wherein the external ribs comprise rods twisted along the length to increase the contact area.

39. A packing element as in claim 29, wherein the external ribs further comprise grooves.

40. A packing element as in claim 29, wherein the drip points are integral to the radial ribs.

41. A packing element as in claim 29, wherein the ribbed shell of the revolution of a conic section is spherical.

42. A packing element as in claim 29, wherein the ribbed shell of the revolution of a conic section is ellipsoidal.

43. A packing element as in claim 29, wherein the drip paints emanate inwardly in the packing element.

44. A packing element as in claim 29, wherein the ring further comprises drip paints.

45. A packing element as in claim 29, wherein the radial ribs further comprise drip points.

46. A packing element as in claim 29, wherein the first half and the second half, are coupled to the spoked conic section structure to enable folding to make the packing element.

47. A packing element as in claim 46, wherein the first half and the second half, are coupled to the spoked conic section structure by living hinges to enable folding to make the packing element.

48. A packing element as in claim 46, wherein the first half, the second half, and the spoked conic section structure are snapped together to make the packing element.

49. A packing element as in claim 46, wherein the first half comprises a plurality of segments of the first half.

50. A packing element as in claim 46, wherein the second half comprises a plurality of segments of the second half.

51. A packing element as in claim 46, wherein the spoked conic section structure comprises a plurality of segments of the spoked conic section structure.

52. A system comprising:
a column; and
at least one packing element packed in the column, wherein the packing element comprises:
a plurality of ribs connected to farm a first segment and a second segment of a ribbed shell of a revolution of a conic section;
a conic section structure connected to a reinforcing plurality of ribs, wherein the conic section structure is connected to the first segment and to the second segment to enable folding to make the packing element; and
at least one drip point positioned within the packing element.

53. A system as in claim 52, wherein the packing element defines apertures.

54. A system as in claim 52, wherein the plurality of ribs comprises
a first plurality of longitudinal ribs and at least one first latitudinal rib in the first segment, and wherein each first plurality of longitudinal ribs further comprises correspondingly a first end and a second end.

55. A system as in claim 54, wherein the first end of at least one of the plurality of ribs terminates to connect at the at least one first latitudinal rib.

56. A system as in claim 52, wherein the plurality of ribs comprises
a second plurality of longitudinal ribs and at least one second latitudinal rib in the second segment, and wherein each second plurality of longitudinal ribs further comprises correspondingly a third end and a fourth end.

57. A system as in claim 56, wherein the third end of at least one of the plurality of ribs terminates to connect at the at least one second latitudinal rib.

58. A system as in claim 52, wherein die ribbed shell of the revolution of a conic section is spherical.

59. A system as in claim 52, wherein the ribbed shell of the revolution of a conic section is ellipsoidal.

60. A system as in claim 52, wherein the drip points emanate inwardly in the packing element.

61. A system as in claim 52, wherein the conic section structure is reinforced with the reinforcing plurality of ribs forming a mesh.

62. A system as in claim 52, wherein the conic section structure further comprises drip points.

63. A system as in claim 52, wherein the reinforcing plurality of ribs further comprise drip points.

64. A system as in claim 52, wherein the first segment and the second segment are coupled to the conic section structure to enable folding to make the packing element.

65. A system as in claim 64, wherein the first segment and the second segment, are coupled to the conic section structure by living hinges to enable folding to make the packing element.

66. A system as in claim 64, wherein the first segment, the second segment, and the conic section structure are snapped together to make the packing element.

* * * * *